(12) United States Patent
Chen

(10) Patent No.: US 9,380,906 B2
(45) Date of Patent: Jul. 5, 2016

(54) MULTIFUNCTIONAL COOKWARE

(71) Applicant: Hsien-Chen Chen, New Taipei (TW)

(72) Inventor: Hsien-Chen Chen, New Taipei (TW)

( * ) Notice: Subject to any disclaimer, the term of this patent is extended or adjusted under 35 U.S.C. 154(b) by 0 days.

(21) Appl. No.: 14/730,564

(22) Filed: Jun. 4, 2015

(65) Prior Publication Data

US 2015/0366392 A1    Dec. 24, 2015

(30) Foreign Application Priority Data

Jun. 18, 2014  (TW) .............................. 103210674 U

(51) Int. Cl.
    *A47J 27/04*    (2006.01)
    *A47J 27/00*    (2006.01)
    *A47J 37/10*    (2006.01)

(52) U.S. Cl.
    CPC ................. *A47J 27/002* (2013.01); *A47J 27/04* (2013.01); *A47J 37/10* (2013.01); *A47J 37/108* (2013.01); *A47J 2027/043* (2013.01)

(58) Field of Classification Search
    CPC ....... A47J 27/002; A47J 27/04; A47J 27/082; A47J 27/05

USPC ............ 220/573.1, 573.4, 537.5, 912, 23.83, 220/23.86; 206/501
See application file for complete search history.

(56) References Cited

U.S. PATENT DOCUMENTS 1,470,199 A * 10/1923 Small .................... A47J 27/13
                                                           131/242

* cited by examiner

*Primary Examiner* — King M Chu
(74) *Attorney, Agent, or Firm* — Muncy, Geissler, Olds & Lowe, P.C.

(57) ABSTRACT

A multifunctional cookware is disclosed. A side of a chassis is provided with a vessel, so that a single cookware can fry foods with the chassis and cook soups with the vessel. The vessel is covered with a lid, further changing the vessel into a vacuum cooker to simmer the foods. Furthermore, a steaming pan is disposed between the vessel and the lid, so that steam produced by heating up liquid in the vessel can steam the foods on the steaming pan, turning the vessel into a steamer. In the present invention, a frying pan, a stockpot, a vacuum cooker and a steamer are combined into one unit, allowing a single cookware to have multiple purposes at a same time, which increases convenience in using the cookware and reduces the space required to accommodate plural cookware.

7 Claims, 5 Drawing Sheets

MULTIFUNCTIONAL COOKWARE

BACKGROUND OF THE INVENTION a) Field of the Invention

The present invention relates to a cookware, and more particularly to a multipurpose cookware which combines the functions of a stockpot, a steamer, a vacuum cooker and a frying pan.

b) Description of the Prior Art

The cookware which is often used in a kitchen includes a frying pan, a steamer, a vacuum cooker and a stockpot. However, as modern people are always busy at work and have to eat out a lot, they rarely cook at homes in spite of having the complete kitchenware and cooking appliances. Therefore, all kinds of cookware are filled into a cupboard but not used regularly, rather becoming decorations that take up a lot of accommodating space. If only one or two cookware is purchased for use in the kitchen to save the space, then it will cause inconvenience in use when there is other cooking requirement due to that the cooking method is different for various cookware.

Accordingly, there is a two-in-one combinatorial cooking pot on the market, which is constituted by combining a semi-circular stockpot vessel with a corresponding semi-circular frying pan. The stockpot vessel is provided with a holding space for cooking foods and an upper opening; whereas, the frying pan is provided with a pan surface for emplacing the foods, and a periphery of the pan surface is formed with a baffle. Therefore, a circular cooking pot is formed by assembling the semi-circular stockpot vessel with the corresponding semi-circular frying pan, and is equipped with the functions of cooking soups and frying foods.

Nevertheless, the abovementioned two-in-one combinatorial cooking pot is only provided with the functions of cooking the soups and frying the foods; therefore, it is not very broad in the application, as the two-in-one combinatorial cooking pot is not suitable for other cooking method, such as steaming or simmering. Accordingly, the conventional two-in-one combinatorial cooking pot is still in need of improvement to increase the function and application thereof.

SUMMARY OF THE INVENTION

In view of that the conventional two-in-one combinatorial cooking pot is limited in functions and is not very convenient in use, a multifunctional cookware with more purposes at a same time is required, so that a single cookware can be used for many different cooking methods, thereby improving the convenience in using the cookware, avoiding the difficulty in purchasing plural cookware but not using them and increasing the flexibility in using the space of the cupboard indirectly.

To achieve the abovementioned needs and purposes, a multifunctional cookware is disclosed in the present invention. The multifunctional cookware includes a pot body which is provided with a chassis and a vessel, with the chassis being provided with a top surface and a bottom surface, and the vessel being formed at a side of the chassis and being provided with a holding space; a steaming pan which is covered at a side of the vessel opposite to the chassis and is optionally dismantled from the vessel, with the steaming pan being provided with vent holes penetrating the steaming pan; and a pot lid, the shape of which corresponds to the periphery of the vessel, with the pot lid being covered optionally on a side of the steaming pan opposite to the vessel, forming a sealed space with the vessel.

The advantage of the present invention includes that by using the chassis as a frying pan, the holding space formed by the vessel at a side of the chassis can be used as a stockpot, and can be optionally used as a vacuum cooker if being covered by the pot lid. In addition, the steaming pan with the vent holes is disposed between the vessel and the pot lid, allowing the steam produced by heating up the liquid in the vessel to dissipate to the upper part of the steaming pan, so that the steaming pan can act as a steamer. The abovementioned cookware is a single cookware which combines the functions of the frying pan, stockpot, vacuum cooker and steamer, so that a single cookware can have four different purposes, which improves effectively the shortcoming of the conventional two-in-one combinatorial cooking part that it can be only used for frying foods and cooking soups, thereby increasing the function of a single cookware significantly.

It is preferably that a side wall of the said vessel is provided with a pillar which corresponds to the center of the top surface of the chassis. An end of the pillar opposite to the chassis is formed with a fixing pole, and a side of the steaming pan is provided with a through-hole which corresponds to the fixing pole. In this technical means, the fixing pole is transfixed in the through-hole of the steaming pan to fix the steaming pan on the vessel, so that the vessel can be applied more variably.

It is preferably that the periphery of the chassis is provided with a chassis wall which is protruded toward a direction away from the bottom surface of the chassis, and the periphery of the steaming pan is formed with a baffle which is protruded toward a direction away from the vessel. In addition, the chassis and the steaming pan are formed with ridges respectively which are protruded toward a direction away from the bottom surface of the chassis. In this technical means, the periphery of the chassis or steaming pan is formed simply with a grid, so that foods on the chassis or steaming pan will not drop out by being put too close to the edge thereof, and the pot body will not tilt and drop out from the chassis. Furthermore, the provision of the ridges on the chassis increases the contact area of the foods with the chassis, which increases the heating area of the foods and improves the efficiency of cooking and heating the foods.

It is preferably that the upper rims of the chassis wall and the vessel are formed with a hand-held part respectively which is extended toward a direction away from the center of the chassis; whereas, a side of the pot lid is provided with a handle. In addition, the pot lid is formed with a groove at a location opposite to a direction along which the pillar of the vessel is extended. The provision of the said hand-held parts facilitates a user to access or move the cookware or the pot lid, which improves the convenience in using the cookware. On the other hand, by providing the groove on the pot lid, in addition to being covered on the steaming pan, the pot lid can be also covered on the chassis to fry the foods.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
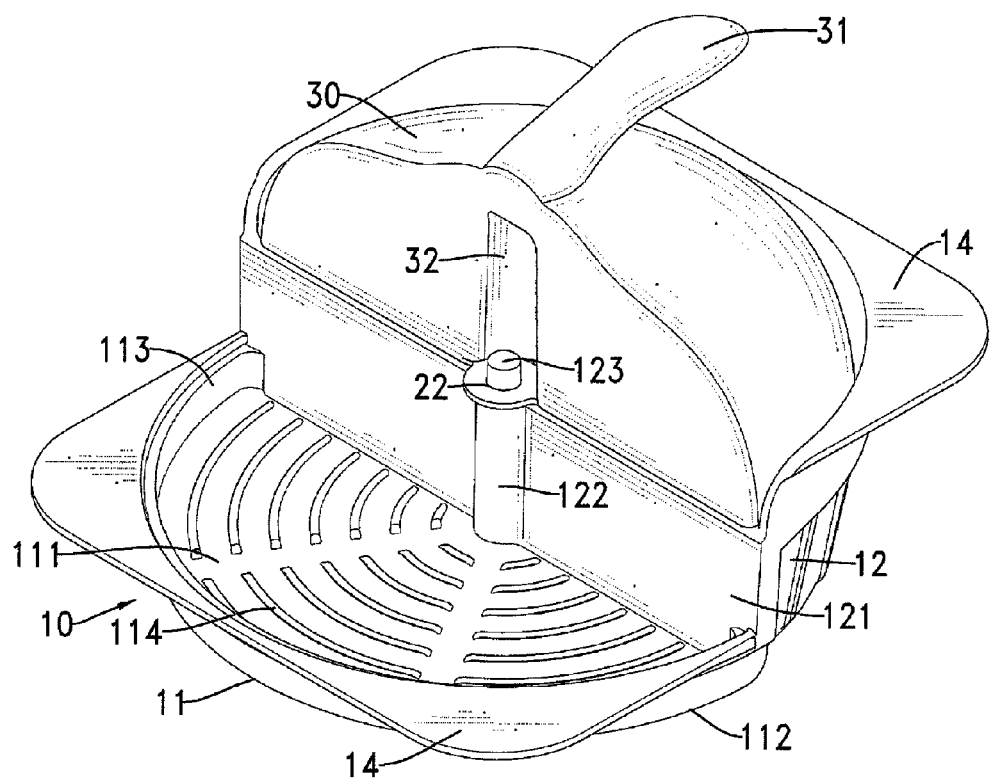
FIG. 1 shows a three-dimensional schematic view of a multifunctional cookware of the present invention.
Figure 2:
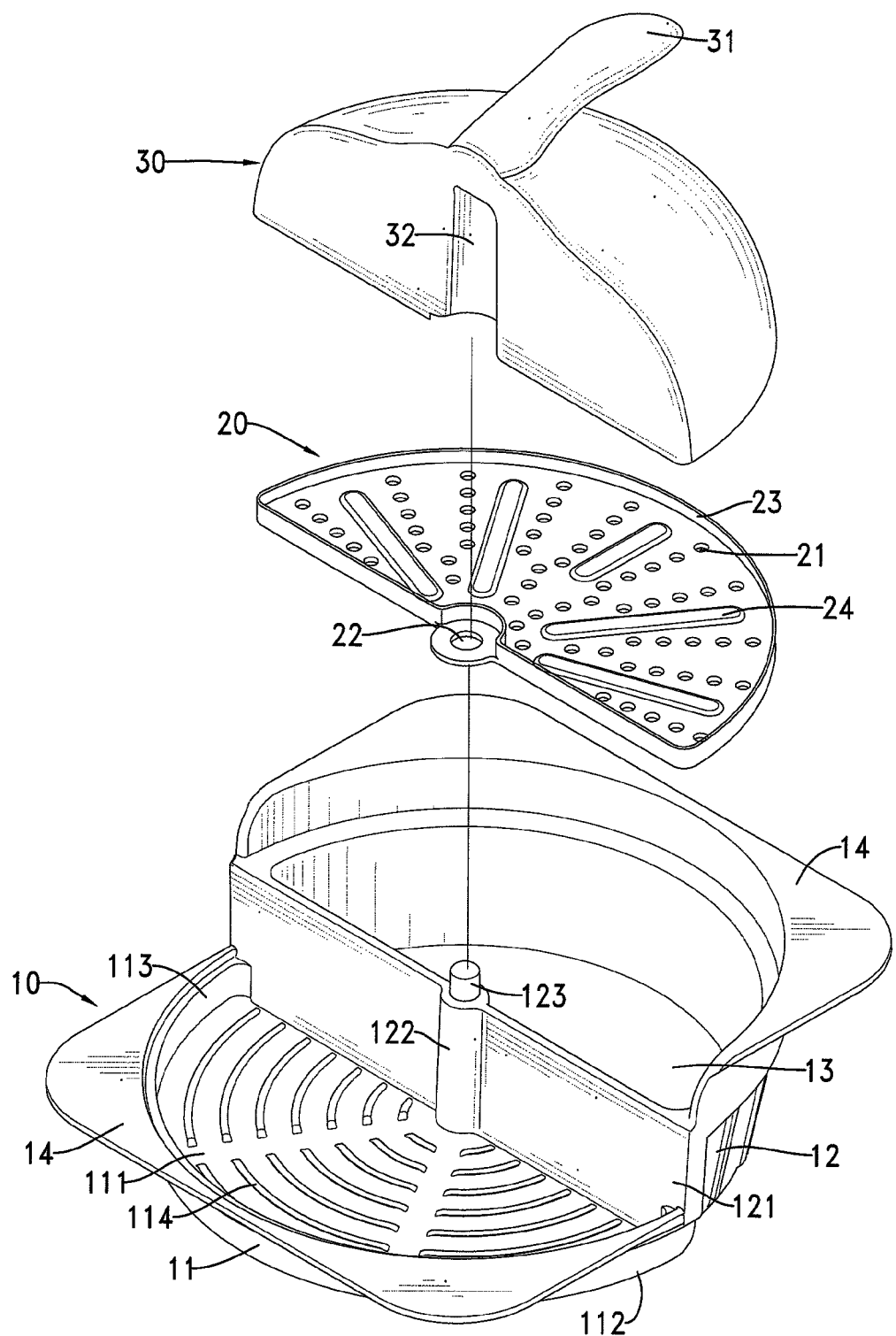
FIG. 2 shows a three-dimensional exploded view of the multifunctional cookware of the present invention.

Referring to FIG. 1 and FIG. 2, a multifunctional cookware of the present invention comprises a pot body 10, a steaming pan 20 and a pot lid 30.

The pot body 10 includes a chassis 11 and a vessel 12. The chassis 11 is provided with a top surface 111 and a bottom surface 112; whereas, the vessel 12 is formed at a side of the chassis 11 and is provided with a holding space 13 which is used as a stockpot.

The steaming pan 20 is covered on a side of the vessel 12 opposite to the chassis 11 and is provided with plural vent holes 21 penetrating the steaming pan 20. The steam produced by cooking the liquid in the vessel 12 can dissipate through the vent holes 21 to an exterior part of the vessel 12. In addition, the steaming pan 20 can be optionally dismantled from the vessel 12.

The shape of the pot lid 30 corresponds to the periphery of the vessel 12, and a side of the pot lid 30 is provided with a handle 31 by which the pot lid 30 can be covered on the steaming pan 20 optionally, thereby closing the holding space 13 inside the vessel 12 to form a sealed space.

A side wall 121 of the abovementioned vessel 12 is provided with a pillar 122 which corresponds to the center of the top surface 111 of the chassis 11. An end of the pillar 122 opposite to the chassis 11 is formed with a fixing pole 123, and a side of the steaming pan 20 is provided with a through-hole 22 which corresponds to the fixing pole 123, which allows the fixing pole 123 to be transfixed in the through-hole 22 to fix the steaming pan 20 on the vessel 12.

The periphery of the abovementioned chassis 11 is further provided with a chassis wall 113 which is protruded toward a direction away from the bottom surface 111 of the chassis 11. The periphery of the steaming pan 20 is further formed with a baffle 23 which is protruded toward a direction away from the vessel 12. The said chassis wall 113 and baffle 23 act as a grid at the periphery of the chassis 11 and steaming pan 20 respectively, so that the foods to be cooked on the chassis 11 and the steaming pan 20 will not drop out by being put too close to the edge of the chassis 11 or steaming pan 20.

The said chassis 11 and steaming pan 20 are formed respectively with plural protruded ridges 114, 24 to increase the contact area of the foods with the surface of the chassis 11 and steaming pan 20, thereby increasing the heating area of the foods to improve the efficiency of cooking.

The upper rims of the said chassis wall 113 and vessel 12 are extended along a direction away from the center of the chassis 11 to form a hand-held part 14 respectively, facilitating a user to take the pot body 10 with both hands.

The said pot lid 30 is formed with a groove 32 at a location opposite to the direction along which the pillar 122 of the vessel 12 is extended, so that in addition to that the pot lid 30 can be covered on the steaming pan 20, the pot lid 30 can be also covered on the chassis 11 by rotating the pot lid 30 by an angle for frying the foods.

Figure 3:
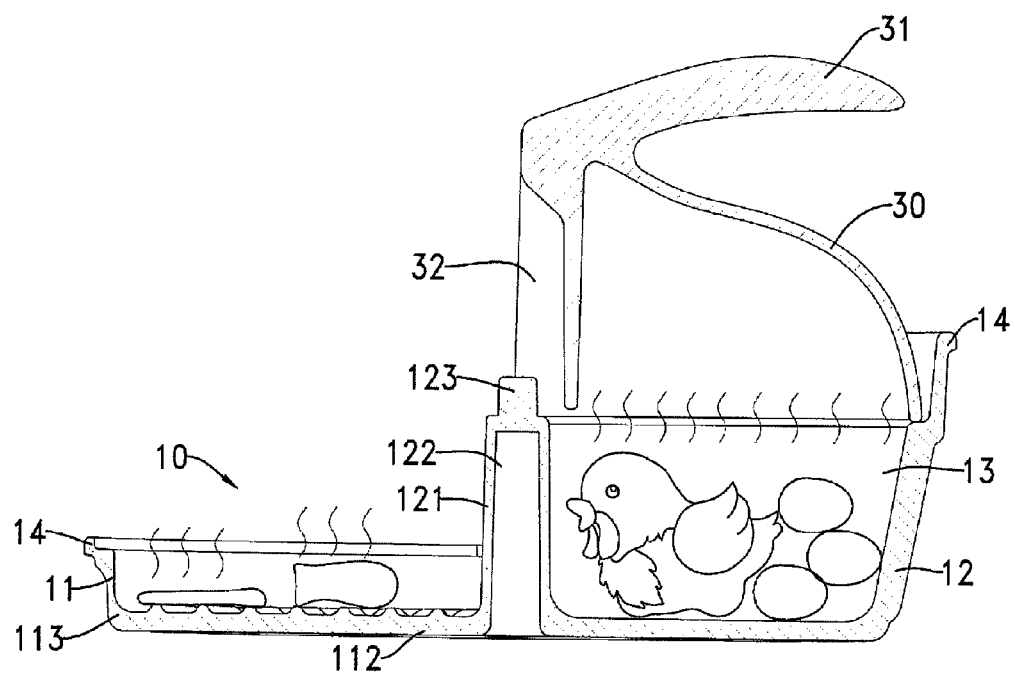
FIG. 3 shows a schematic view of an implementation state of the multifunctional cookware of the present invention.

Referring to FIG. 3, when the present invention is applied practically, the upper part of the vessel 12 is covered with the pot lid 30, allowing the inner space formed by the vessel 12 and the pot lid 30 to act as a stockpot or a vacuum cooker. On the other hand, the foods to be fried can be put directly on the chassis 11, so that the foods can be fried at a same time when the soup is cooked or the foods are simmered, thereby achieving the multipurpose effect to the cookware.

Figure 4:
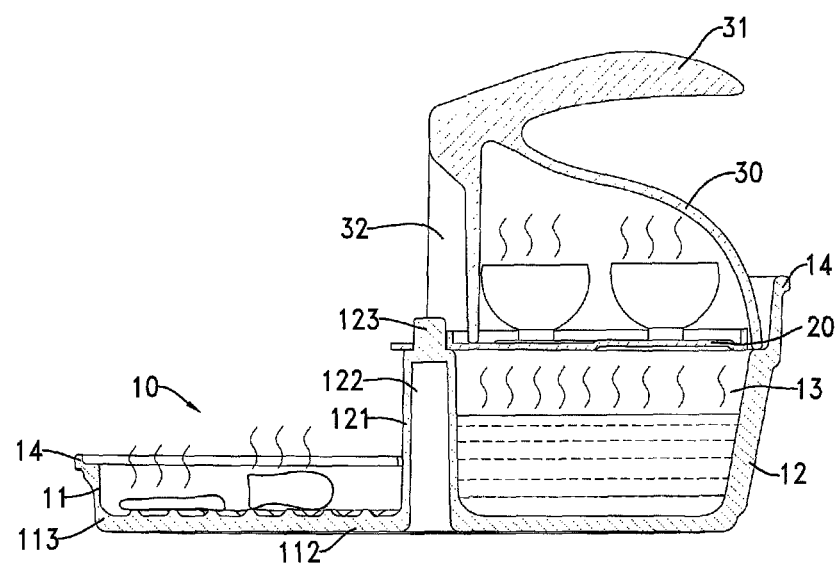
FIG. 4 shows a schematic view of another implementation state of the multifunctional cookware of the present invention.

As shown in FIG. 4, when the present invention is applied practically, water can be first filled into the vessel 12, then the upper rim of the vessel 12 is covered with the abovementioned steaming pan 20 on which the foods to be cooked are put, and finally, the pot lid 30 is covered on to steam. The foods to be fried can be also put directly on the chassis 11 for cooking, which achieves the functions of steaming and frying at a same time.

Figure 5:
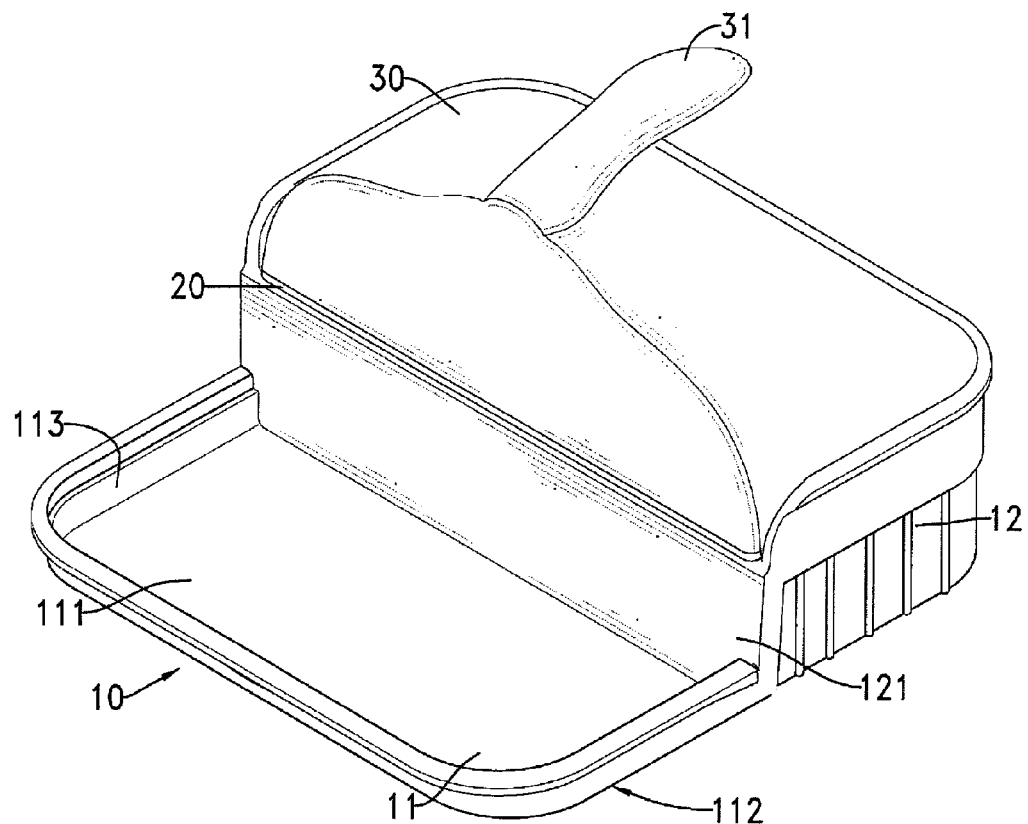
FIG. 5 shows a schematic view of another embodiment of the multifunctional cookware of the present invention.

As shown in FIG. 5, it shows another embodiment of the multifunctional cookware of the present invention. The pot body 10 is in a square shape, and the chassis 11 and the vessel 12 are disposed at each side of the square pot body 10 respectively, dividing the square pot body 10 into two symmetric rectangular units. In addition, the shape of the pot body 10 corresponds to the rectangular shape of the vessel 12, enabling the pot lid 30 to be optionally covered on the vessel 12 to close the interior part of the vessel 12, thereby forming a sealed space.

Accordingly, the multifunctional cookware of the present invention is formed by combing the chassis 11 with the vessel 12, allowing the pot body 10 to have the functions of cooking soups and frying foods. Furthermore, the vessel 12 is covered with the pot lid 30 to form the sealed space inside the vessel 12 to act as the vacuum cooker. In addition, by providing the steaming pan 20 between the vessel 12 and the pot lid 30, when the vessel 12 is loaded with water, the foods on the steaming pan 20 can be steamed, thereby achieving the function of steaming the foods. This design allows the multifunctional cookware of the present invention to be used as a stockpot, a steamer, a vacuum cooker and a frying pan at a same time, which facilitates the user to cook more conveniently and solves the problem of requiring a huge accommodating space for many conventional cookware. Therefore, the multifunctional cookware of the present invention is very suitable for use in a modern day of life.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A multifunctional cookware, comprising a pot body, the pot body having a chassis and a vessel, with the chassis being provided with a top surface and a bottom surface, the vessel being formed at a side of the chassis and being provided with a holding space; a steaming pan, the steaming pan covering a surface of the vessel opposite to the chassis and being removable from the vessel, and the steaming pan being provided with vent holes penetrating the steaming pan; and a pot lid having a shape corresponding to a periphery of the vessel, and the pot lid removably covering a surface of the steaming pan opposite to the vessel to form a sealed space with the vessel; wherein a side of the pot lid is provided with a handle, and a groove is formed on the pot lid at a location opposite to the direction along which a pillar of the vessel is extended.

2. A multifunctional cookware, comprising: a pot body, the pot body having a chassis and a vessel, with the chassis being provided with a top surface and a bottom surface, the vessel being formed at a side of the chassis and being provided with a holding space; a steaming pan, the steaming pan covering a surface of the vessel opposite to the chassis and being removable from the vessel, and the steaming pan being provided with vent holes penetrating the steaming pan; and a pot lid having a shape corresponding to a periphery of the vessel, and the pot lid removably covering a surface of the steaming pan opposite to the vessel to form a sealed space with the vessel;

wherein a side wall of the vessel is provided with a pillar, with the pillar corresponding to center of the top surface of the chassis, an end of the pillar being formed with a fixing pole opposite to the chassis, and a side of the steaming pan being provided with a through-hole which corresponds to the fixing pole.

3. The multifunctional cookware according to claim 2, wherein the periphery of the chassis is provided with a chassis wall which is protruded along a direction away from the bottom surface of the chassis, and the periphery of the steaming pan is formed with a baffle which is protruded along a direction away from the vessel.

4. The multifunctional cookware according to claim 3, wherein the chassis and the steaming pan are formed with protruded ridges respectively which are protruded along a direction away from the bottom surface of the chassis.

5. The multifunctional cookware according to claim 3, wherein upper rims of the chassis wall and the vessel are formed with a hand-held part respectively which is extended along a direction away from a center of the chassis.

6. The multifunctional cookware according to claim 2, wherein the chassis and the steaming pan are formed with protruded ridges respectively which are protruded along a direction away from the bottom surface of the chassis.

7. The multifunctional cookware according to claim 2, wherein a side of the pot lid is provided with a handle, and a groove is formed on the pot lid at a location opposite to the direction along which the pillar of the vessel is extended.

\* \* \* \* \*